No. 643,529. Patented Feb. 13, 1900.
S. R. PATTEN.
DEVICE FOR GRIPPING AND DELIVERING MAIL BAGS.
(Application filed May 24, 1899.)
(No Model.) 6 Sheets—Sheet 1.

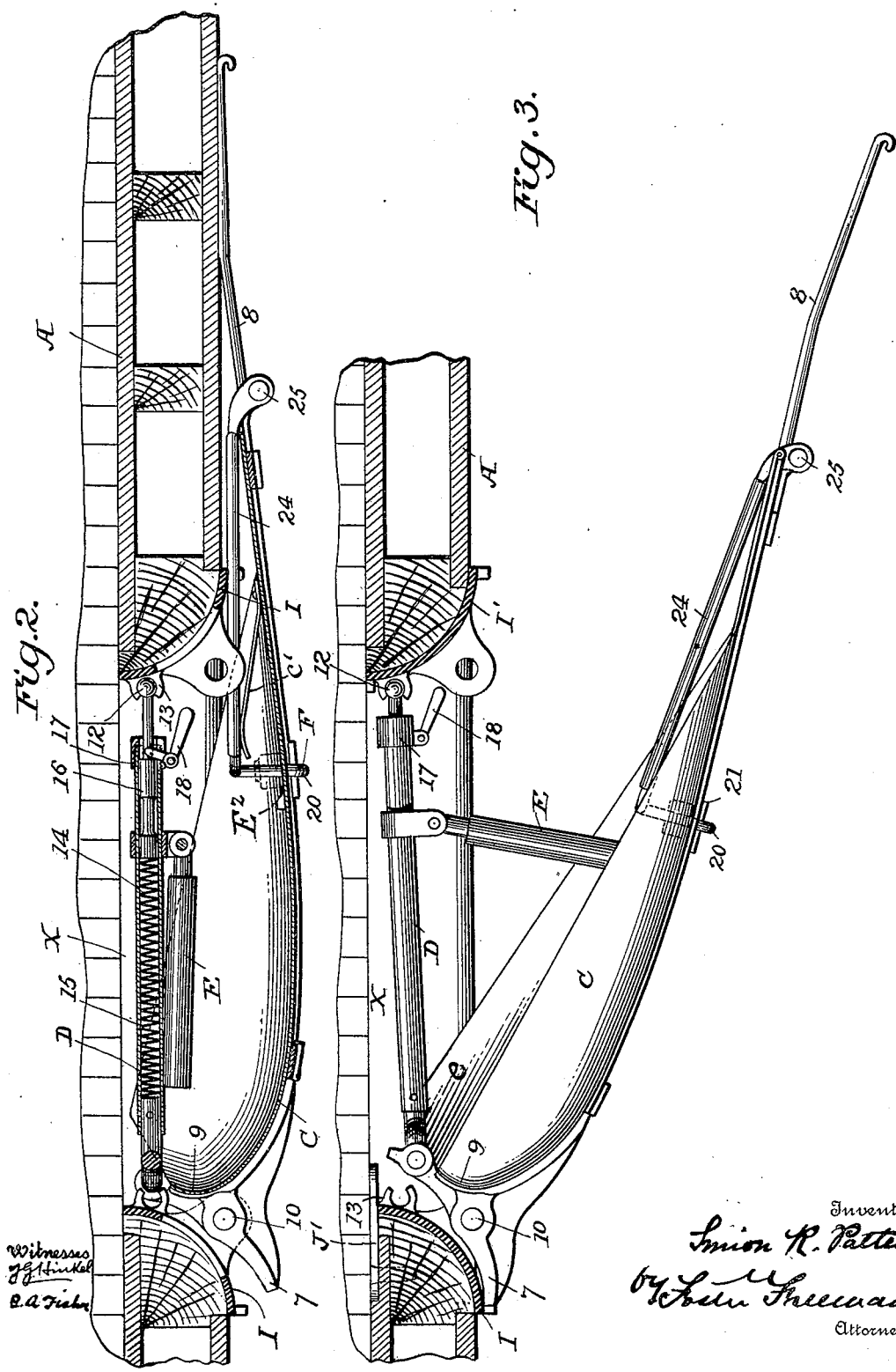

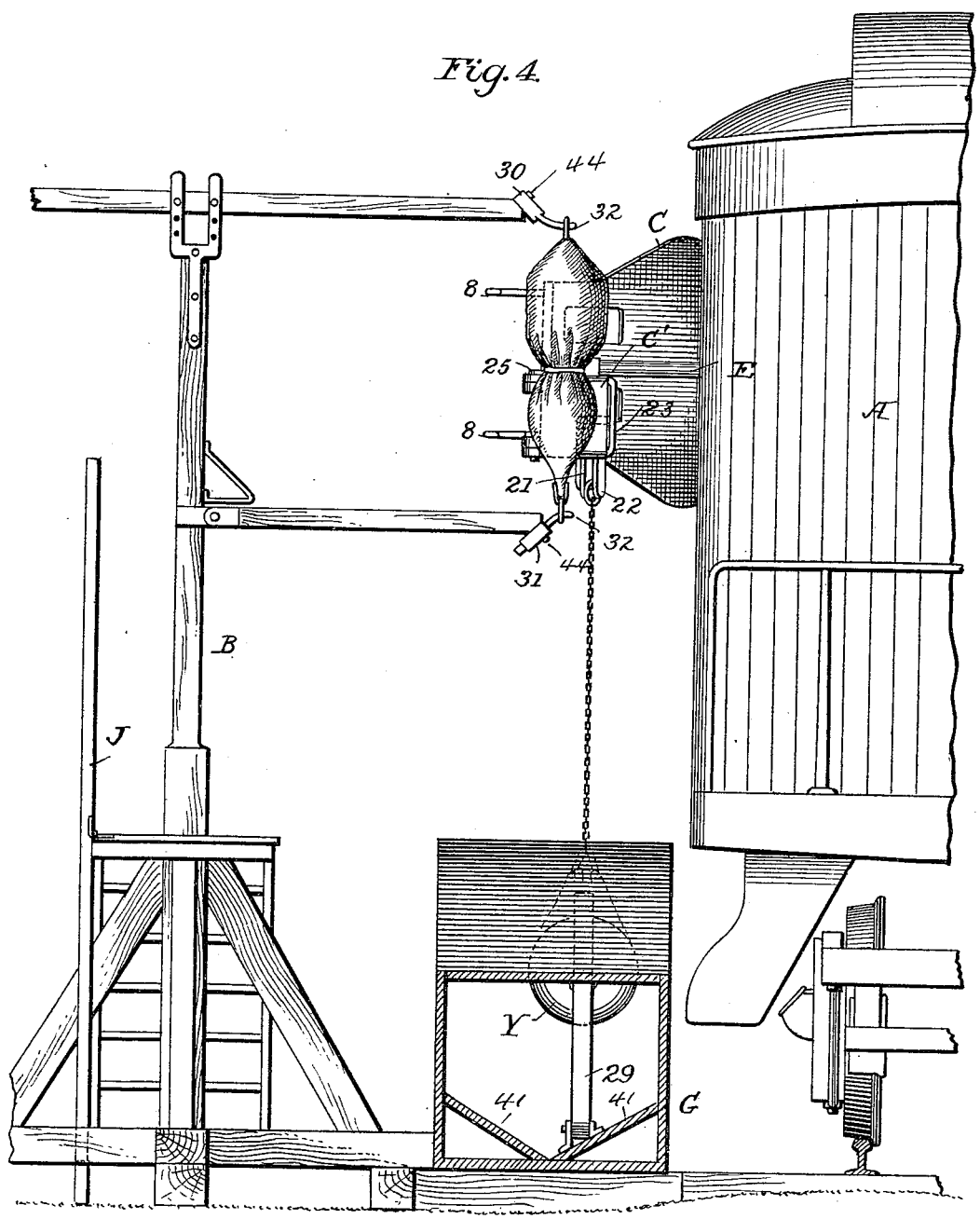

No. 643,529. Patented Feb. 13, 1900.
S. R. PATTEN.
DEVICE FOR GRIPPING AND DELIVERING MAIL BAGS.
(Application filed May 24, 1899.)
(No Model.) 6 Sheets—Sheet 4.
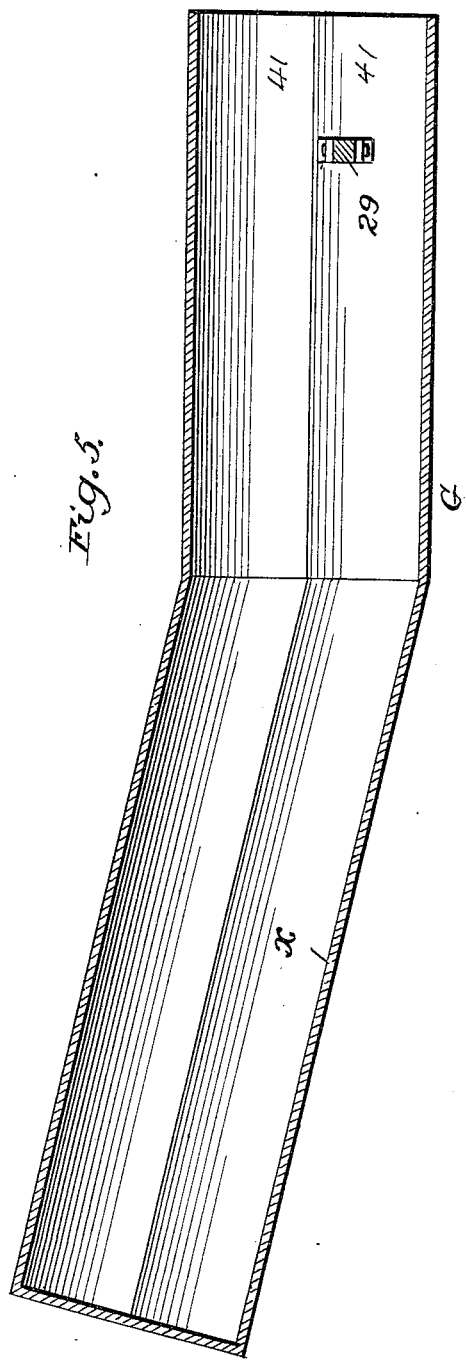
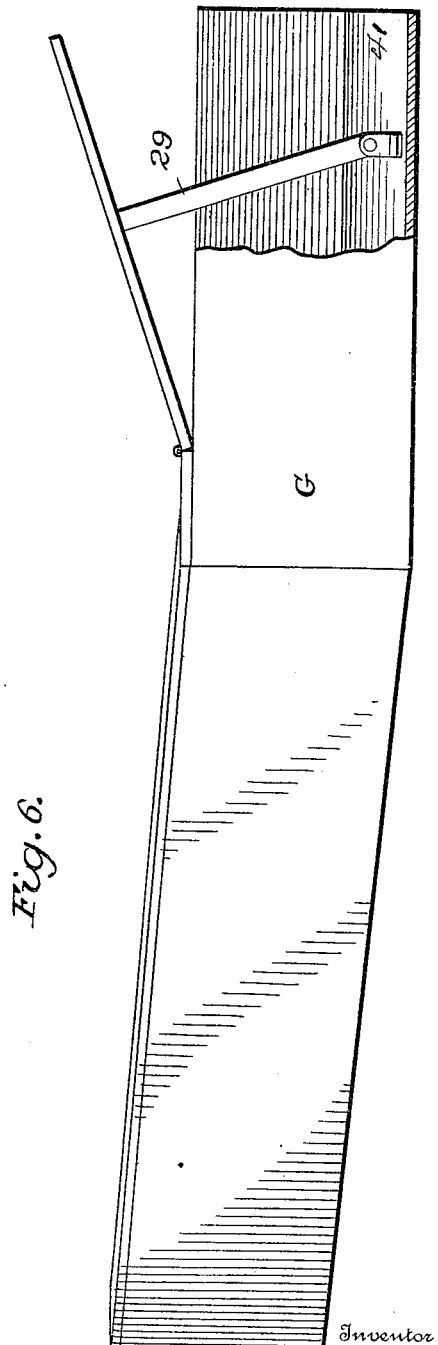

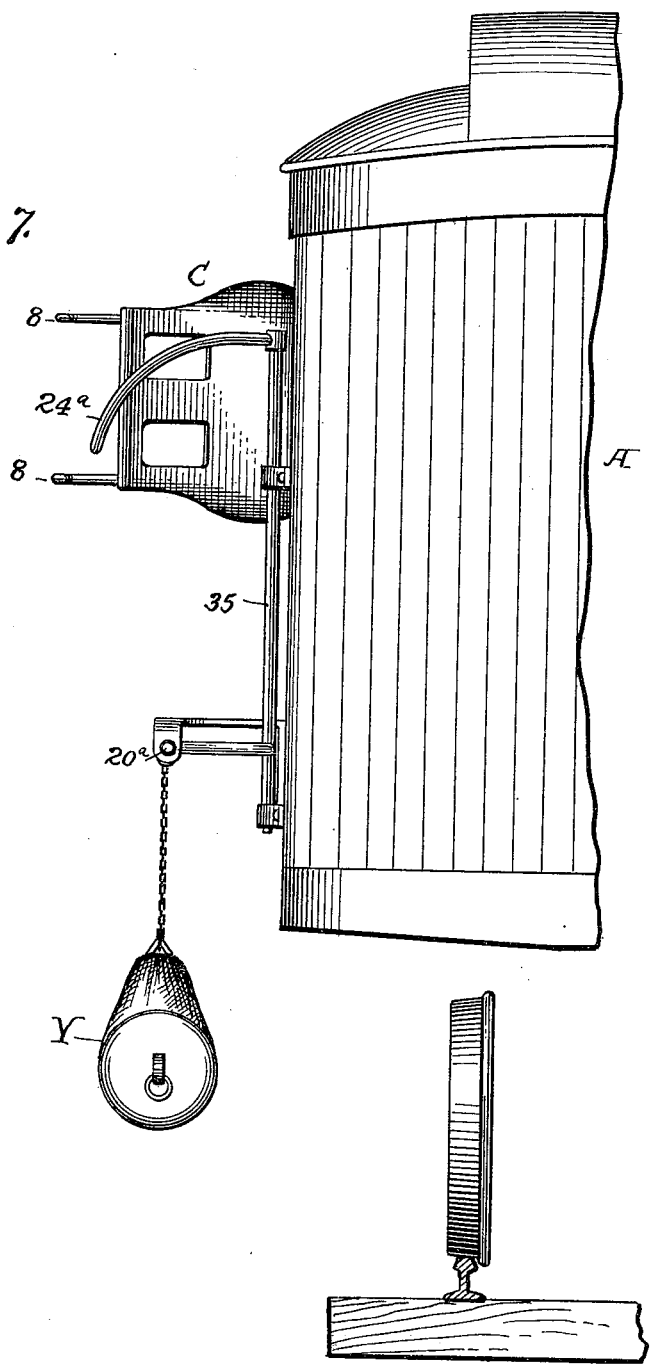

No. 643,529. Patented Feb. 13, 1900.
S. R. PATTEN.
DEVICE FOR GRIPPING AND DELIVERING MAIL BAGS.
(Application filed May 24, 1899.)
(No Model.) 6 Sheets—Sheet 6.

UNITED STATES PATENT OFFICE.

SIMON RICE PATTEN, OF OMAHA, NEBRASKA, ASSIGNOR OF ONE-HALF TO ALFRED MILLARD, OF SAME PLACE.

DEVICE FOR GRIPPING AND DELIVERING MAIL-BAGS.

SPECIFICATION forming part of Letters Patent No. 643,529, dated February 13, 1900.

Application filed May 24, 1899. Serial No. 718,048. (No model.)

*To all whom it may concern:*

Be it known that I, SIMON RICE PATTEN, a citizen of the United States, residing at Omaha, in the county of Douglas and State of Nebraska, have invented certain new and useful Improvements in Devices for Gripping and Delivering Mail-Bags, of which the following is a specification.

My invention has for its object to collect mail-bags upon and deliver them from passing trains; and to this end my invention consists in certain improved devices and appliances combined with the mail-car and the crane, substantially as set forth hereinafter and as illustrated in the accompanying drawings, in which—

Figure 1:
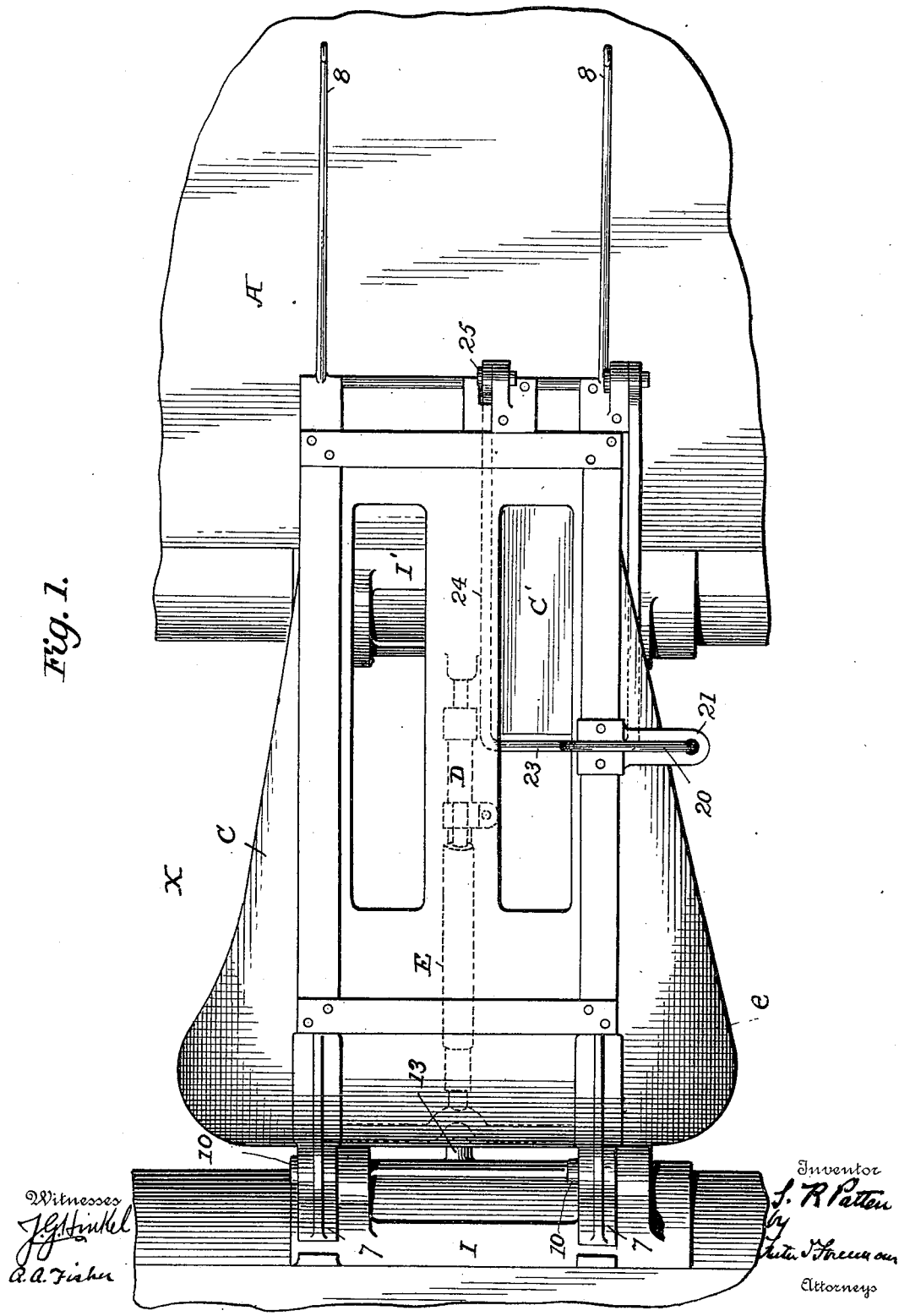
Figure 8:
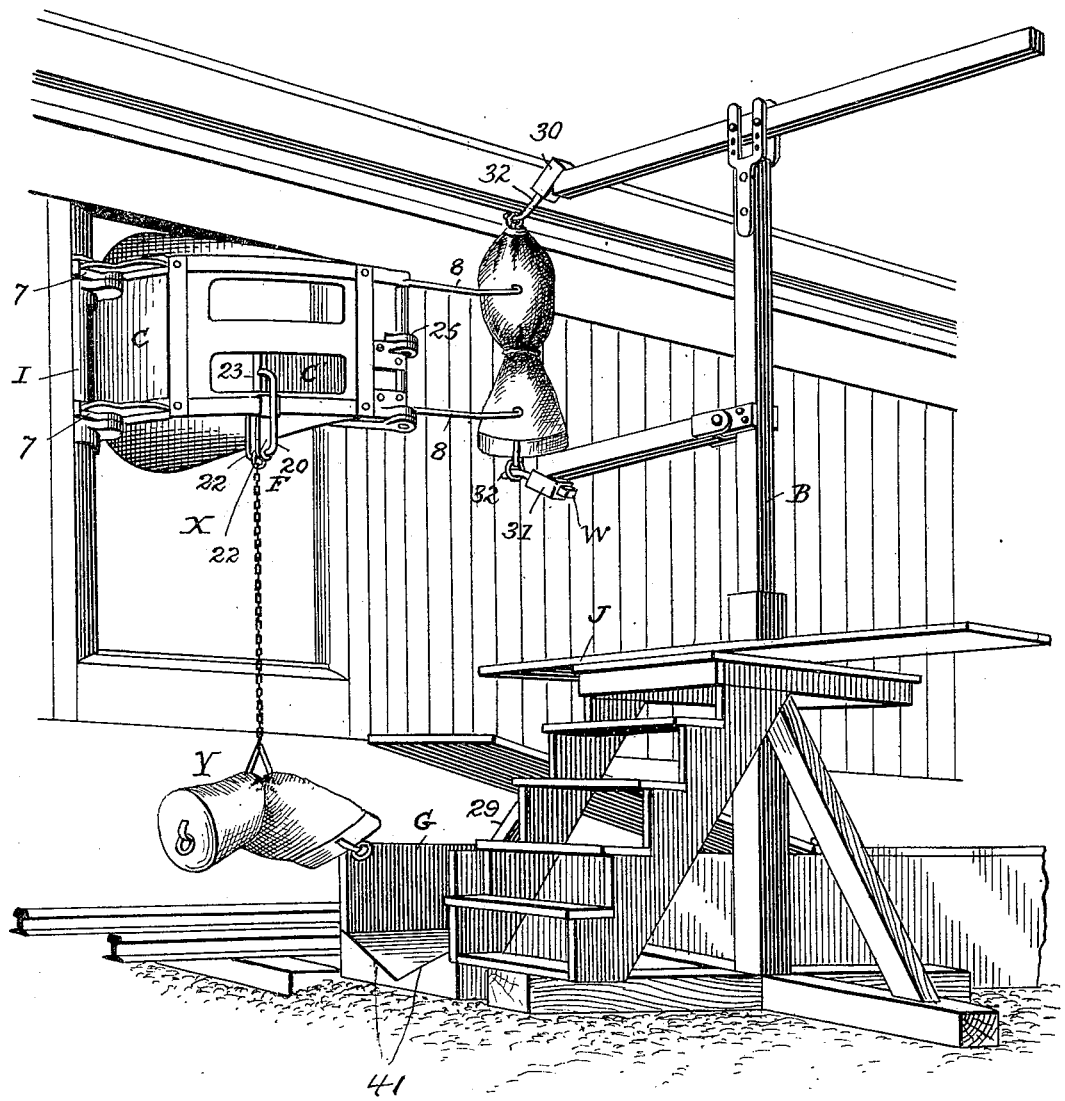

Figure 1 is a side view of part of a mail-car and its attachments embodying my improvements. Fig. 2 is a longitudinal section of the parts shown in Fig. 1; Fig. 3, a like section showing the parts in a different position; Fig. 4, a view showing part of a mail-car with its attachments and the crane and its adjuncts and embodying my improvements. Fig. 5 is a longitudinal sectional plan of the pouch-receiving trough at the station; Fig. 6, a side view, in part section, of Fig. 5; Fig. 7, an end view of part of the car, illustrating a modification of the pouch-delivery appliances. Fig. 8 is a perspective view of the car and crane, showing the parts in position for action.

The mail-car A, of any suitable construction, is provided with a side opening X, which may be the usual door-opening of the car or an opening specially provided for the purpose, and the crane B may be of any of the usual characters, but has special features which will hereinafter be fully set forth. With the car and the crane are combined suitable appliances for delivering the mail bags or pouches from the crane to the car and from the car to the station, as will now be described.

The car is provided with a bag-gripping device consisting, essentially, of a frame C and a cross-bar D. The frame C may be formed in any suitable manner of a number of connected parallel bars or otherwise and at the rear edge is pivoted to the car, preferably the pivot being so arranged that the frame is practically when closed nearly flush with or but slightly projecting beyond the outer face of the car-body and extending across and beyond the door, with a flange 7 at the inner end of the frame near the pivot-point so arranged as to limit the extent to which the frame may be swung outward at the free end. The frame therefore when thrown outward occupies a position inclined to the plane of the car-body adapted to engage the bag or pouch suspended vertically between the arms of the crane. To insure such engagement without the necessity of suspending the pouch in a position too close to the car-body, I provide the frame with arms 8 8, extending forward from the forward end, which serve to engage and deflect the pouch toward the inner side of the main body of the frame.

Across the opening X extends the bar D, toward which the frame tends to swing to its closed position under the action of a spring arranged at any suitable point, and with these appliances I combine a detent E, shown as an arm pivoted to the bar D, so as to swing in parallel thereto, as shown in Fig. 2, or to be swung outward to the position shown in Fig. 3, where it engages a stop $E^2$, thereby maintaining the frame in its outer or open position adapted to engage the suspended pouch. The detent E is so arranged that when the pouch has been engaged and disconnected from the crane and passes relatively inward toward the pivoted end of the frame the said detent will be engaged by the pouch and thrown into the position shown in Fig. 2, when the frame will swing inward, gripping the pouch between it and the bar D. Owing to the rapidity with which these motions must be performed and to the generally rapid movement of trains means must be provided for receiving the shock of the pouch as it comes to a state of rest in order to prevent it from being injured as it is delivered to the car and to prevent the momentum or percussive action of the pouch from tending in any way to throw open the frame. To this end the frame is made of such width as to afford a bearing for the main body of the pouch, which therefore cannot be cut, as results when the pouch is thrust rapidly between two bars. Further, I provide at the pivoted end of the frame a pocket or bearing formed by extending a flange 9 inward beyond the pintle or pivot 10 and presenting a face against which the pouch is brought to bear with a force which tends to act to close the frame and cause it to grip the pouch more firmly against the gripper-bar D instead of tending to cause the frame to swing outwardly and release the pouch. After the pouch has thus been delivered and received and gripped it may be disengaged by removing the bar D, which is made detachable or movable for this purpose. To this end the bar D may be supported in any suitable manner, but preferably is pivoted at one end at the edge of the flange 9 and is provided at the other end with an enlargement or ball 12, adapted to a socket 13 in the door-frame, said socket being open at the top to permit the ball 12 to be inserted and removed.

I prefer to make use of the bar D as a means of supporting the spring 14, which acts to close the frame. As shown, the bar is provided with a casing 15 containing said spring and receiving at the outer end a sliding rod 16, constituting practically a continuation of the bar and carrying the ball 12 at its outer end. The rod 16 has enlargements, one bearing against the spring and the other serving to act as a guide, and is held in place by a screw-cap 17, the action of the spring tending to thrust the rod 16 longitudinally outward and the flange 9 in the opposite direction to close the frame against the side of the car.

It is desirable to prevent any rebound of the frame after closing. The impact of the pouch against the flange 9 will aid in this; but to render it certain I may use a suitable safety-catch. One form is shown in the drawings as a bevel-ended pawl J', thrown down by a spring to engage the part 9. Any other suitable safety-catch may be employed, that shown being typical only.

The lower edge of the frame is bent inward, forming an incline e, which serves to deflect the pouch inward and within the car should it drop after being gripped.

When the bar D is swung inward to release the bag, it is desirable to draw in the rod 16, and this may be effected by means of a lever 18, pivoted to the screw-cap 17 on the end of the casing 15, with a short arm having lugs bearing on the enlargement of the rod 16 and with a long arm serving as a handle which when swung toward the rod 16 enables the latter to be forced inward against the stress of the spring, when the ball 12 can be lifted from its socket and the bar D swung inward.

By means of appliances above described the bag is delivered from the crane, is received in the clamping device without injury and without tending to force open the frame, and is maintained in position in the gripping device, thereby avoiding injury resulting from discharging it forcibly into the car and against the persons or contents therein, while it can be readily removed from the gripping device whenever required.

Usually on approaching a station it is not only necessary to deliver a pouch to the car, but to also deliver a pouch from the car to the station. In the customary manner the delivery of the pouch from the car to the station is accompanied with danger of injury to the pouch, due to throwing the latter onto the track, where it is cut by the wheels of the cars, or striking objects at the station. To prevent such results, I provide appliances which I will now describe.

The frame C is provided with a positive detent or lock F, adapted to engage a ring or link connected with the pouch Y, which hangs suspended, as indicated in Fig. 8. This detent or lock may be of any suitable character, but, as shown, consists of a bolt 20, passing through a perforated ear 21 and into contact with a parallel ear 22 and through the link or ring which is passed between the said ears, so that said link or ring can only escape when the bolt is withdrawn. This bolt is connected in any suitable manner with a trigger or contact-piece C' upon the frame C, so that when the bag or pouch delivered from the crane is brought against such contact-piece the bolt or detent will be withdrawn and positively release the pouch. The contact-piece C' and its connections with the detent may be of any suitable character to effect the result desired; but, as shown, the bolt is at the lower end of an arm 23, which extends vertically from the contact-piece C', the latter being in the form of a lever consisting of arms 24, pivoted at 25 to the frame C, the arms 24 being at the inner side of the frame in such position as to be struck by the bag or pouch as the latter passes along the inner face of the frame toward the flange 9, the arms 24 being thus thrust outward, carrying with them the bolt 20, constituting the detent.

The contact-piece C' may consist of the arm or arms 24 alone; but I prefer to cover and connect the arms by a sheet or plate of metal, as shown in the drawings, so that the bag will slide safely over them. The contact-piece C' is preferably under stress of a suitable spring c', which tends to hold it in proper position with the bolt in a locking position.

To prevent the pouch when detached from the car from falling onto the track or beneath the wheels of the train, I arrange adjacent to the track a guard 40, so as to occupy a position parallel with the track and between the same and the path of the hanging pouch, as shown in Fig. 4. This guard may consist simply of a vertical plate; but preferably it constitutes one side of a receiving-trough G, into which the pouch is projected, being thereby prevented from being thrown against any object.

To gradually reduce the momentum of the bag as it passes through the receiving-trough, I prefer to extend the rear portion of the latter at an angle to the receiving end, so that as the bag passes from the receiving end it will strike the inclined face $x$ and will then rebound against the other face, pursuing a zig-zag course until it is arrested at the end of the trough. This course is facilitated by forming the bottom with inclines 41 41, thereby making it substantially V-shaped in cross-section. The V-shaped form of the bottom portion of the trough is very desirable for the reason that the bag will when delivered to the trough have a tendency to become wedged therein, and this, with the deflected end portion of the trough, will stop the bag or so decrease its velocity before it reaches the end of the trough that there will be no danger of breaking the end by its impact or injuring the contents of the bag. This is especially the case when a heavy bag is delivered from a car moving at a high speed. A trough with a flat or a rounded bottom would not possess the above advantages.

Preferably the trough is a covered trough to prevent the entrance of rain and snow as much as possible; but as the cover would interfere with the delivery of the bag I hinge a section of the same at the forward end, as shown in Fig. 6, supporting it by a pivoted arm 29, so arranged as to be struck and deflected by the incoming bag, thus permitting the hinge portion of the cover to descend.

To secure the free delivery of the bag from the arms $B'$ $B^2$ of the crane B, I provide the latter with pivoted blocks 30 31, swinging freely on said arms and each having a rigid hook 32 for engaging links upon the pouch, which links slide readily from said hooks as the blocks swing to one side when the gripper-frame engages the pouch, but otherwise tend to hold the pouch firmly in place. A stop $b'$ limits the upward movement of the lower arm $B'$. One advantage of my crane is that the bag can be delivered to a train going in either direction, and the agent cannot hang the bag wrong, there being only one way to hang it. It will be observed that the hooks 32 are only slightly curved and are entirely unobstructed. There will therefore be no resistance, except that arising from friction, to the disengagement of the links and hooks.

To enable the blocks supporting the clips or hooks 32 to be secured to the arms of ordinary cranes, I use the construction shown in Fig. 8, where each hook 32 extends from a block, the lower being provided with a counterweight $w$, which tends to hold the lower hook in its upper position, while the weight of the upper clip tends to hold it in its lowest position. The bearings or pivots 44 of the blocks are inclined, the upper one upward and the lower one downward, as shown, whereby the swing of the blocks carries the hooks or clips to a position to freely deliver the bag.

To enable the agent to readily obtain access to the arms of the crane to adjust the bag thereon, I provide a platform J. Inasmuch, however, as the latter when horizontal would be in the way of the trains and of the gripper devices thereon, I hinge the platform J to a supporting part of the crane at a point beyond the center of the platform, so that the latter will always assume a vertical position (shown in Fig. 4) except when it is turned down horizontally by the act of the agent before he takes his position upon the platform.

Ordinarily each car is provided with two receiving and gripping appliances such as described, one at each side of the car, and one means of providing a ready attachment for the gripping device consists in constructing metallic cheek-pieces I I', adapted to be fitted to the jamb or side pieces of the opening X. This permits the device to be constructed for ready application to and adjustment of position on car-bodies without altering the construction of the latter. Preferably the cheek-pieces I I' are practically duplicates of each other, so that a gripping device may be pivoted to either one of the cheek-pieces on either side of the opening X, so as to deliver the bag through the same opening in the side of the car going in either direction. As, however, the gripping devices are practically rights and lefts and as it is usual to have an opening on the opposite sides of the car, it is apparent that only two gripping devices are necessary, as they can be interchanged and arranged to deliver bags from either side as the car goes in either direction.

It will be seen that by supporting the pouch which is to be delivered from the car upon the frame C the pouch is carried away from the body of the car when the frame is swung outward to engage the pouch carried by the crane, thereby lessening the danger of throwing the pouch onto the track. I do not limit myself to this arrangement, however, inasmuch as the detent supporting said pouch may be supported upon an arm or bracket extending from the car-body separate from the frame C and operated by a detent arranged upon the car-body—as, for instance, as illustrated in Fig. 7, where the trigger $24^a$ is an arm extending from a shaft 35, swinging in bearings at the side of the car-body, and having at the lower end a bolt $20^a$, which engages the link connected with the pouch, all arranged so that the contact of the bag delivered from the crane with the arm $24^a$ will positively release the bag to be delivered from the car.

Without limiting myself to the precise construction and arrangement of parts shown, I claim as my invention—

1. A bag-gripping device for attachment to a mail-car consisting of a hinged frame and a cross-bar, a spring for throwing the frame inward toward the bar, a detent for holding the frame away from the bar, and cheek-pieces adapted for attachment to the jambs of an opening in the car, substantially as set forth.

2. The combination with a car having a side opening, of a bag-gripping device comprising a hinged frame, a cross-bar, a spring arranged to throw the frame inward toward the bar, and a detent for holding the frame outward, arranged to be struck by the pouch passing along the inner face of the frame, substantially as set forth.

3. The combination with the cross-bar D of the frame C for engaging a pouch supported by a crane, a support to which the frame is pivoted, and a flange 9 at the pivoted end of the frame, substantially as set forth.

4. The combination of a car having an opening, a bar extending across said opening and a pouch-engaging frame pivoted at one side of said opening, and provided near its pivoted point with a bearing-face for receiving the impact of the pouch, substantially as set forth.

5. The combination of a car having an opening, a bar extending across said opening and a pouch-engaging frame pivoted at one side of said opening, and provided near its pivoted point with a bearing-face extending inward from the pivot, substantially as set forth.

6. The combination with a car having a side opening, of a bag-gripping device comprising a hinged frame, means for limiting the outward movement of the frame, a cross-bar, a spring arranged to swing the frame inward toward the bar, and a detent for holding the frame in proper position, substantially as set forth.

7. The combination with a car having a side opening, a hinged frame C, and actuating-spring, of a cross-bar, and means on the car, on opposite sides of the opening, for supporting the bar movably in its position, substantially as set forth.

8. The combination with a car provided with a side opening, of a gripping-bar pivoted at one side of the opening to swing horizontally across it, a gripping-frame pivoted to the car on one side of the opening to coöperate with the bar, a detent to hold the frame in its open position, and a spring to swing the frame inward, substantially as set forth.

9. The combination with a car having a side opening, of a frame pivoted at one side of said opening and provided with projecting arms 8, 8, a bar extending across said opening, a spring normally tending to close the frame against the bar, and a detent for holding the frame open and adapted to be released by the impact of the incoming bag, substantially as set forth.

10. The combination with a car having a side opening, of a bolt or detent arranged to engage a link attached to a pouch to be delivered at the station, a trigger arranged to make contact with a pouch supported in position to be delivered to the car, and connections between said trigger and said detent, substantially as set forth.

11. The combination with a pouch-engaging frame and means for delivering the pouch to a car, of a detent carried by the frame and arranged to engage a link connected to a pouch, and a trigger, also carried by the frame in position to be operated by a pouch engaged by the frame and connected to operate said detent, substantially as set forth.

12. The combination with the pivoted frame C, of a bar pivoted to said frame and consisting of two sections, one tubular to receive the other and a spring arranged within the tube and bearing upon the section sliding therein, substantially as set forth.

13. The combination with the frame C, of a bar D pivoted thereto and provided with a sliding section 16 having an end adapted to a socket upon the frame of the door, a spring bearing on the sliding section, and means for drawing back the latter, substantially as set forth.

14. The combination with the crane and its supporting-arms, of pivots 44 on the ends of the arms, that on the upper arm inclining outwardly and upwardly, and that on the lower arm inclining downwardly and outwardly, a block mounted on each pivot to turn freely thereon, the preponderance of weight in each block being below its pivot, and a slightly-curved and unobstructed hook 32 rigidly secured in each block, substantially as and for the purpose set forth.

15. The combination with a crane arranged adjacent to the track, of a receiving-trough having the rear portion inclined in respect to the receiving end, substantially as described.

16. The pouch-receiving trough having a bottom substantially V-shaped in cross-section, and its rear portion inclined in respect to the receiving end, substantially as set forth.

17. The combination with the crane, of a receiving-trough having a cover the forward section of which is hinged, and a trigger or detent arranged to support the hinged end at an elevated position and to be struck by the incoming pouch, substantially as described.

18. The combination of frame C, a spring normally tending to force it inwardly, a releasable device to hold the frame outward, and a releasable catch for retaining it in the inner position, substantially as set forth.

19. The combination with the spring-actuated frame C provided with an incline e, of a releasable device to hold the frame against the force of its actuating-spring, substantially as set forth.

In testimony whereof I have signed my name to this specification in the presence of two subscribing witnesses.

SIMON RICE PATTEN.

Witnesses:
 F. L. FREEMAN,
 W. C. DUVALL.